(12) United States Patent
Kou et al.

(10) Patent No.: US 12,037,532 B2
(45) Date of Patent: Jul. 16, 2024

(54) CHILD SAFETY CAR SEAT

(71) Applicant: Wonderland Switzerland AG, Steinhausen (CH)

(72) Inventors: Yong Chao Kou, Guangdong (CN); Feng Xiang Yan, Guangdong (CN); Jian Hui Liu, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/139,362

(22) Filed: Apr. 26, 2023

(65) Prior Publication Data
US 2023/0257656 A1 Aug. 17, 2023

Related U.S. Application Data

(63) Continuation of application No. 17/861,263, filed on Jul. 11, 2022, now Pat. No. 11,667,847, which is a (Continued)

(30) Foreign Application Priority Data

Jul. 28, 2017 (CN) .......................... 201720939006.4
May 31, 2018 (CN) .......................... 201810551224.X

(51) Int. Cl.
| | |
|---|---|
| *C09K 21/14* | (2006.01) |
| *B32B 5/18* | (2006.01) |
| *B32B 5/24* | (2006.01) |
| *B32B 5/32* | (2006.01) |
| *B32B 27/06* | (2006.01) |

(Continued)

(52) U.S. Cl.
CPC .............. *C09K 21/14* (2013.01); *B32B 5/18* (2013.01); *B32B 5/245* (2013.01); *B32B 5/32* (2013.01); *B32B 27/065* (2013.01); *B60N 2/2881* (2013.01); *B60N 2/64* (2013.01); *B60N 2/70* (2013.01); *B32B 2262/062* (2013.01); *B32B 2307/3065* (2013.01); *B32B 2307/72* (2013.01)

(58) Field of Classification Search
CPC .......... B60N 2/2881; B60N 2/64; B60N 2/70; B32B 2262/062; B32B 2307/3065; B32B 2307/72; B32B 5/18; B32B 5/245; B32B 5/32; B32B 27/065; C09K 21/14
USPC ....................................................... 297/250.1
See application file for complete search history.

(56) References Cited

U.S. PATENT DOCUMENTS

| | | |
|---|---|---|
| 4,824,719 A | 4/1989 | Creyf |
| 4,892,769 A | 1/1990 | Perdelwitz, Jr. |

(Continued)

*Primary Examiner* — Mark R Wendell
(74) *Attorney, Agent, or Firm* — Volpe Koenig

(57) ABSTRACT

The present application discloses a child safety car seat having a main body and a fireproof buffering structure disposed on the main body. The fireproof buffering structure includes a buffering plate and a fireproof plate attached to or neighboring to the buffering plate, and the fireproof plate is closer to a seating space of the child safety car seat than the buffering plate. In contrast to conventional child safety car seats, the fireproof buffering structure of the present application adopts the combined buffering plate and fireproof plate. The buffering plate has good impact absorbing capacity for providing a soft and comfortable seating environment and buffering and protection effects during a crash accident, and the fireproof plate can reduce the combustion rate of the integral structure when catching fire. Therefore, the child safety car seat achieves the purposes of safety and comfort.

19 Claims, 18 Drawing Sheets

Related U.S. Application Data continuation of application No. 17/075,677, filed on Oct. 20, 2020, now Pat. No. 11,414,603, which is a continuation of application No. 16/044,459, filed on Jul. 24, 2018, now Pat. No. 10,851,304.

(51) Int. Cl.
*B60N 2/28* (2006.01)
*B60N 2/64* (2006.01)
*B60N 2/70* (2006.01)

(56) References Cited

U.S. PATENT DOCUMENTS

| | | |
|---|---|---|
| 4,948,648 A | 8/1990 | Dadgar |
| 5,085,487 A | 2/1992 | Weingartner |
| 5,137,777 A | 8/1992 | Silverman |
| 7,421,750 B2 | 9/2008 | Knoff |
| 9,340,134 B2 | 5/2016 | Posnien |
| 10,851,304 B2 | 12/2020 | Kou |
| 2005/0026528 A1 | 2/2005 | Forsten |
| 2010/0327648 A1 | 12/2010 | Livengood |
| 2013/0174344 A1 | 7/2013 | Klancnik |
| 2013/0174346 A1 | 7/2013 | Klancnik |
| 2014/0239681 A1 | 8/2014 | Bourgoin |
| 2016/0068088 A1 | 3/2016 | Stevens-Poire' |

CHILD SAFETY CAR SEAT

CROSS REFERENCE TO RELATED APPLICATIONS

This application is a continuation application of U.S. application Ser. No. 17/861,263, filed on Jul. 11, 2022, which is a continuation application of U.S. application Ser. No. 17/075,677, filed on Oct. 20, 2020, which is a continuation application of U.S. application Ser. No. 16/044,459, filed on Jul. 24, 2018. The contents of these applications are incorporated herein by reference.

BACKGROUND OF THE INVENTION

1. Field of the Invention

The present invention relates to a child safety car seat, and more particularly, to a child safety car seat which combines buffering capacity and flame-retardant effect.

2. Description of the Prior Art

A child safety car seat provides a seating space with a suitable size for a child in a car ride, and buffering structures are disposed on surrounding walls of the child safety car seat which are in contact with the child to serve as a buffer during a crash so that possibility of injury to the child might be reduced. The buffering structure can be fixed to a main body of the child safety car seat and covered under a seat cloth, or the buffering structure can be disposed on the seat cloth. For example, a supporting cushion or a headrest is often mounted to the upper backrest portion of an infant basket safety seat for supporting and protecting an infant's head, and the buffering structure can be disposed inside the supporting cushion for improving safety.

Conventional buffering structures are foams made of expanded polypropylene (EPP), expanded polystyrene (EPS) or expandable polyethylene (EPE) and in a shape of a plate or a block. The foams have good impact absorbing capacity for effective buffering. However, the foams are also flammable and have a higher combustion rate upon ignition, which is unsafe for application. Alternatively, the foams in the child safety car seat can be replaced by a flame-retardant material, but the hardness of the flame-retardant material reduces the impact absorbing capacity and comfort of the child safety car seat.

Therefore, it is necessary to develop a buffering structure that combines buffering capacity and flame-retardant effect so as to improve safety and comfort of the child safety car seat.

SUMMARY OF THE INVENTION

Therefore, it is an objective of the present application to provide a child safety car seat which combines buffering capacity and flame-retardant effect.

To achieve the aforementioned objectives, the present application discloses a child safety car seat having a main body and a fireproof buffering structure disposed on the main body. The fireproof buffering structure includes a buffering plate and a fireproof plate attached to or neighboring to the buffering plate, and the fireproof plate is closer to a seating space of the child safety car seat than the buffering plate.

Preferably, a combustion rate of the fireproof plate is lower than a combustion rate of the buffering plate.

Preferably, the buffering plate is a foam plate.

Specifically, a density of the foam plate is substantially between 75 kg/m3 and 98 kg/m3.

Preferably, the fireproof plate is made of at least one of polyethylene (PE), polypropylene (PP), expanded polystyrene (EPS), expanded polypropylene (EPP), expanded polystyrene (EPO), fireproof foam, ethylene-vinylacetate copolymer (EVA), and botanical cotton.

Preferably, a thickness of the fireproof buffering structure is substantially smaller than 13 mm.

Specifically, the thickness of the fireproof buffering structure is substantially equal to 12 mm.

Preferably, the fireproof buffering structure includes a plurality of fireproof plates, and at least part of the plurality of fireproof plates are made of different materials.

Preferably, a shape of the fireproof plate corresponds to a shape of the buffering plate, and the fireproof plate is attached to a surface of the buffering plate.

Specifically, the fireproof buffering structure includes two buffering plates respectively attached to two opposite surfaces of the fireproof plate.

Specifically, the fireproof buffering structure further includes a first auxiliary fireproof plate attached to a surface of one of the two buffering plates away from the fireproof plate and adjacent to the seating space of the child safety car seat.

Specifically, the fireproof buffering structure further includes a first auxiliary fireproof plate, the fireproof plate is attached between the buffering plate and the first auxiliary fireproof plate, and the buffering plate and the first auxiliary fireproof plate are attached to two opposite surfaces of the fireproof plate.

Specifically, the fireproof buffering structure includes two buffering plates, the fireproof plate is attached to one of the two buffering plates, a surface of the first auxiliary fireproof plate is attached to the fireproof plate, and the other one of the two buffering plates is attached to an another surface of the first auxiliary fireproof plate.

Specifically, the fireproof buffering structure further includes a second auxiliary fireproof plate, the first auxiliary fireproof plate and the fireproof plate are attached between opposite surfaces of the two buffering plates facing towards each other, and the second auxiliary fireproof plate is attached to an another surface of the one of the two buffering pates other than the opposite surfaces of the two buffering plates.

Specifically, the child safety car seat further includes a covering member, and the fireproof buffering structure is entirely covered and accommodated inside an insertable and receivable receiving space within a covering pocket accommodated in the covering member through an opening, so that the fireproof buffering structure is restrained inside the covering member after being enclosed into the covering pocket.

Preferably, the covering member includes a head supporting portion and two flanking portions connected with two sides of the head supporting portion, and the fireproof buffering structure is accommodated in at least one of the head supporting portion and the two flanking portions.

Specifically, a soft filler is disposed on a surface of the fireproof buffering structure accommodated in the at least one of the head supporting portion and the two flanking portions.

Specifically, the fireproof buffering structure is attached on at least one of a seat portion, a side portion, a backrest portion and a headrest portion of the main body.

Specifically, the buffering plate is positioned between the fireproof plate and an inner side of the child safety car seat.

In contrast to conventional buffering structures, the fireproof buffering structure of the present application includes the buffering plate and the fireproof plate combined with each other. The buffering plate has good impact absorbing capacity for providing a soft and comfortable seating environment and buffering and protection effects during a crash accident. Besides, the attached fireproof plate can reduce the combustion rate of the integral structure when catching fire. Therefore, the fireproof buffering structure, which can be disposed in the child safety car seat, achieves the inventive purposes of safety and comfort.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
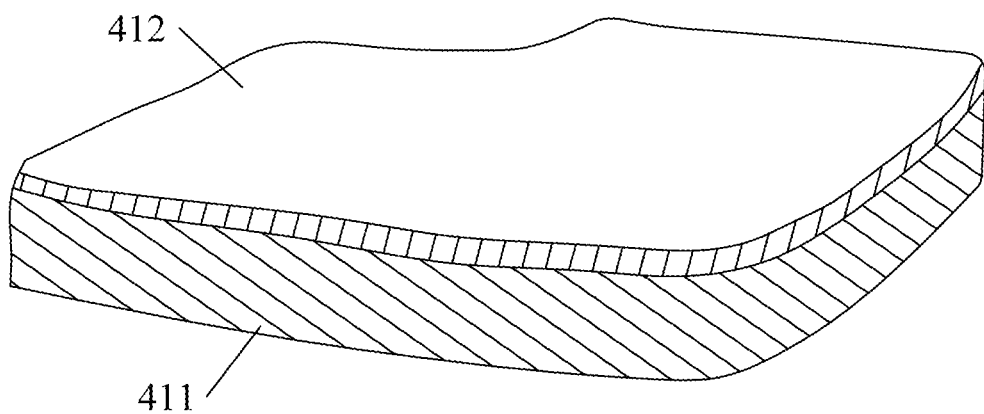
FIG. 1 is a perspective diagram of a fireproof buffering structure according to a first embodiment of the present application.

Please refer to FIG. 1. FIG. 1 is a perspective diagram of a fireproof buffering structure 41 according to a first embodiment of the present application. The fireproof structure 41 provided by the present application is mainly used in a child safety car seat. The fireproof buffering structure 41 includes a buffering plate 411 and a fireproof plate 412 attached to the buffering plate 411. The buffering plate 411 is made of soft material and thereby has good buffering and impact absorbing capacity for protecting an infant's head from fierce impact during an accident. A combustion rate (and a flammability) of the fireproof plate 412 is lower than a combustion rate of the buffering plate 411, so a cross-sectional combustion rate of the integrated buffering plate 411 and fireproof plate 412 is lower than a cross-sectional combustion rate of the buffering plate 411 alone. The buffering plate 411 can be a foam plate made of material such as polyurethane (PU), expanded polypropylene (EPP), expanded polystyrene (EPS) or Expandable Polyethylene (EPE). The buffering plate 411 of the present application can be a foam plate with a density substantially between 75 kg/m3 and 98 kg/m3. Specifically, the foam plate can be made of inert foam, and the density can be substantially 98 kg/m3. Specifically, the fireproof plate 412 can be made of polyethylene (PE), polypropylene (PP), EPS, EPP, expanded polystyrene (EPO), fireproof foam, ethylene-vinylacetate copolymer (EVA), or botanical cotton, and the botanical cotton can be corn cotton. A thickness of the fireproof buffering structure 41 can be substantially smaller than 13 mm, preferably 12 mm. The buffering plate 411 and the fireproof plate 412 are attached to each other via, but not limited to, glue or twin adhesive, and a shape of the fireproof plate 412 can correspond to a shape of the buffering plate 411.

Besides a double-layered structure of the fireproof buffering structure mentioned above, the fireproof buffering structure of the present application can also be, but is not limited to, a triple-layered structure, a quadruple-layered structure, or a quintuple-layered structure, which is described as follows.

Figure 2:
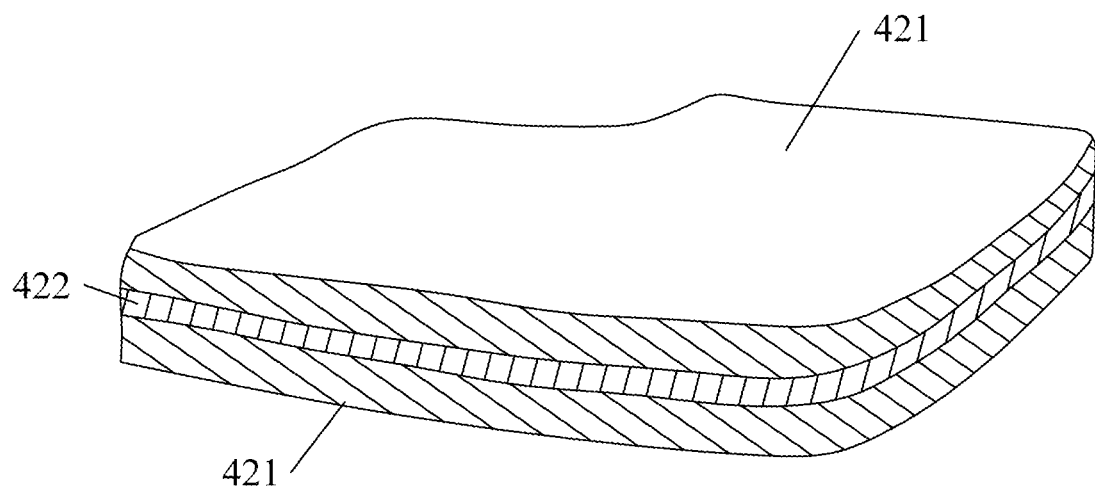
FIG. 2 is a perspective diagram of a fireproof buffering structure according to a second embodiment of the present application.

Please refer to FIG. 2. FIG. 2 is a perspective diagram of a fireproof buffering structure 42 according to a second embodiment of the present application. The fireproof buffering structure 42 is a triple-layered structure and includes a fireproof plate 422 and two buffering plates 421. The two buffering plates 421 are respectively attached to a front surface of the fireproof plate 422 and a rear surface of the fireproof plate 422.

Based on the triple-layered structure of the second embodiment, other auxiliary layers are added to the triple-layered structure, which is described in a third and a fourth embodiments as follows.

Figure 3:
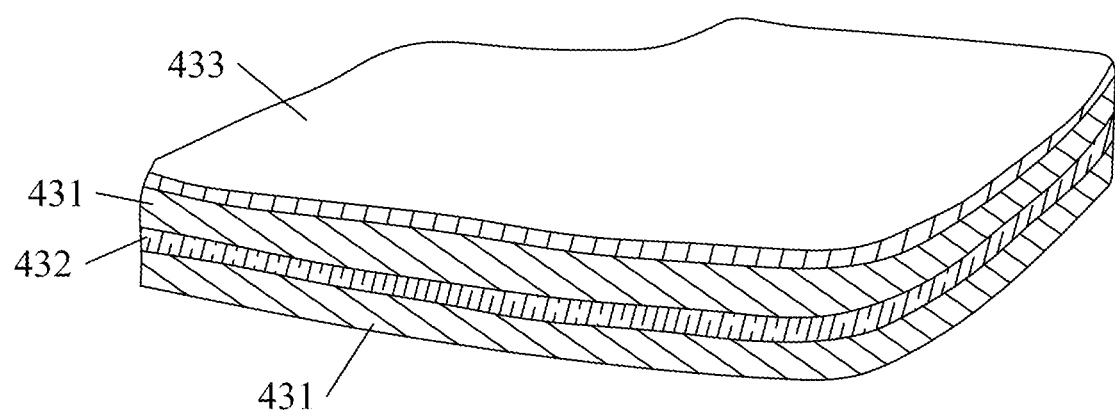
FIG. 3 is a perspective diagram of a fireproof buffering structure according to a third embodiment of the present application.

Please refer to FIG. 3. FIG. 3 is a perspective diagram of a fireproof buffering structure 43 according to a third embodiment of the present application. The fireproof buffering structure 43 is a quadruple-layered structure and includes two buffering plates 431, a fireproof plate 432, and a first auxiliary fireproof plate 433. A surface of the fireproof plate 432 is attached to one of the two buffering plates 431, and a surface of the other buffering plate 431 is attached to another surface of the fireproof plate 432. The first auxiliary fireproof plate 433 is attached to a surface of the other buffering plate 431. Therefore, the first auxiliary fireproof plate 433 is attached to another surface of the other buffering plate 431 away from the fireproof plate 432.

Figure 4:
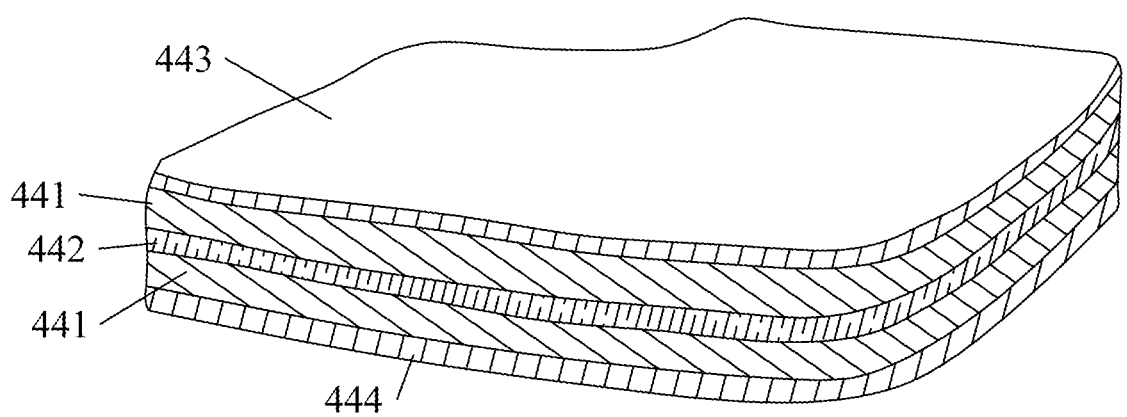
FIG. 4 is a perspective diagram of a fireproof buffering structure according to a fourth embodiment of the present application.

Please refer to FIG. 4. FIG. 4 is a perspective diagram of a fireproof buffering structure 44 according to a fourth embodiment of the present application. The fireproof buffering structure 44 is a quintuple-layered structure and includes two buffering plates 441, a fireproof plate 442, a first auxiliary fireproof plate 443, and a second auxiliary fireproof plate 444. Two surfaces of the two buffering plates 441 are respectively attached to a front surface of the fireproof plate 442 and a rear surface of the fireproof plate 442. The first auxiliary fireproof plate 443 and the second auxiliary fireproof plate 444 are respectively attached to two another surfaces of the two buffering plates 441. Therefore, the first auxiliary fireproof plate 443 and the second auxiliary fireproof plate 444 are respectively attached to the two another surfaces of the two buffering plates 441 away from the fireproof plate 442.

Figure 5:
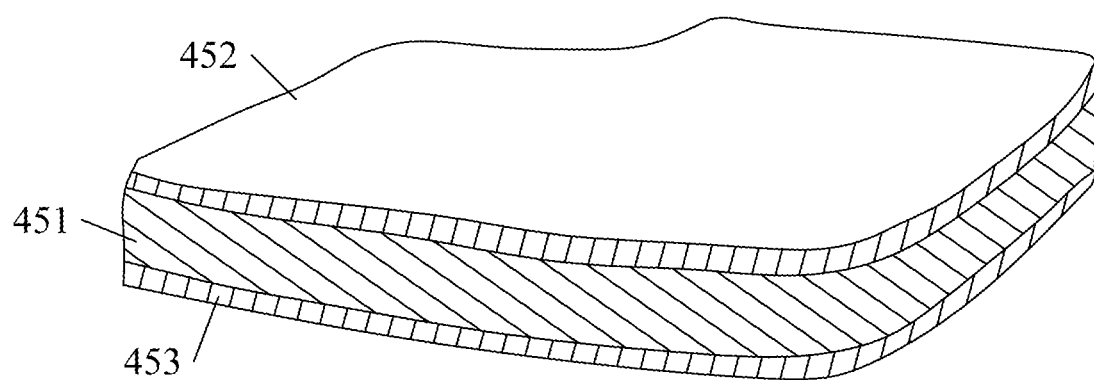
FIG. 5 is a perspective diagram of a fireproof buffering structure according to a fifth embodiment of the present application.

Please refer to FIG. 5. FIG. 5 is a perspective diagram of a fireproof buffering structure 45 according to a fifth embodiment of the present application. The fireproof buffering structure 45 is a triple-layered structure and includes a buffering plate 451, a fireproof plate 452, and a first auxiliary fireproof plate 453. The fireproof plate 452 and the first auxiliary fireproof plate 453 are respectively attached to a front surface of the buffering plate 451 and a rear surface of the buffering plate 451.

Figure 6:
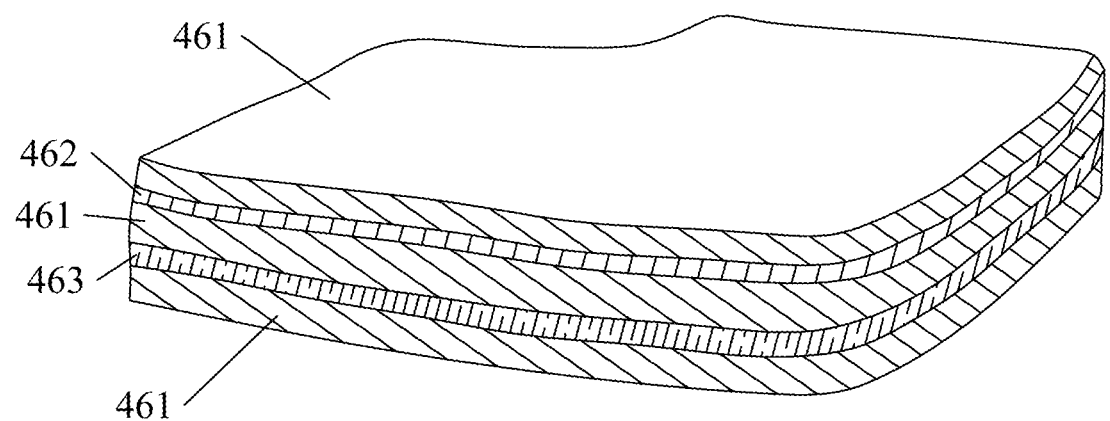
FIG. 6 is a perspective diagram of a fireproof buffering structure according to a sixth embodiment of the present application.

Please refer to FIG. 6. FIG. 6 is a perspective diagram of a fireproof buffering structure 46 according to a sixth embodiment of the present application. Based on the triple-layered structure of the fifth embodiment, other auxiliary layers are added to the triple-layered structure in the sixth embodiment. The fireproof buffering structure 46 includes three buffering plates 461, a fireproof plate 462, and a first auxiliary fireproof plate 463. A surface of the fireproof plate 462 and a surface of the first auxiliary fireproof plate 463 are respectively attached to a front surface and a rear surface of one of the three buffering plates 461, and the other two of the three buffering plates 461 are respectively attached to another surface of the fireproof plate 462 and another surface of the first auxiliary fireproof plate 463.

Figure 7:
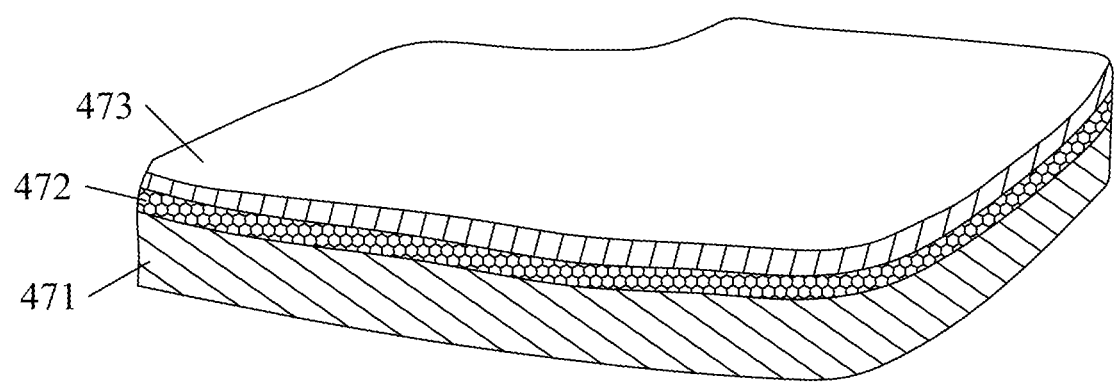
FIG. 7 is a perspective diagram of a fireproof buffering structure according to a seventh embodiment of the present application.

Please refer to FIG. 7. FIG. 7 is a perspective diagram of a fireproof buffering structure 47 according to a seventh embodiment of the present application. The fireproof buffering structure 47 is a triple-layered structure and includes a buffering plate 471, a fireproof plate 472, and a first auxiliary fireproof plate 473. A surface of the fireproof plate 472 is attached to the buffering plate 471, and the first auxiliary fireproof plate 473 is attached to another surface of the fireproof plate 472.

Based on the triple-layered structure of the seventh embodiment, other auxiliary layers are added to the triple-layered structure, which is described in an eighth embodiment and a ninth embodiment as follows.

Figure 8:
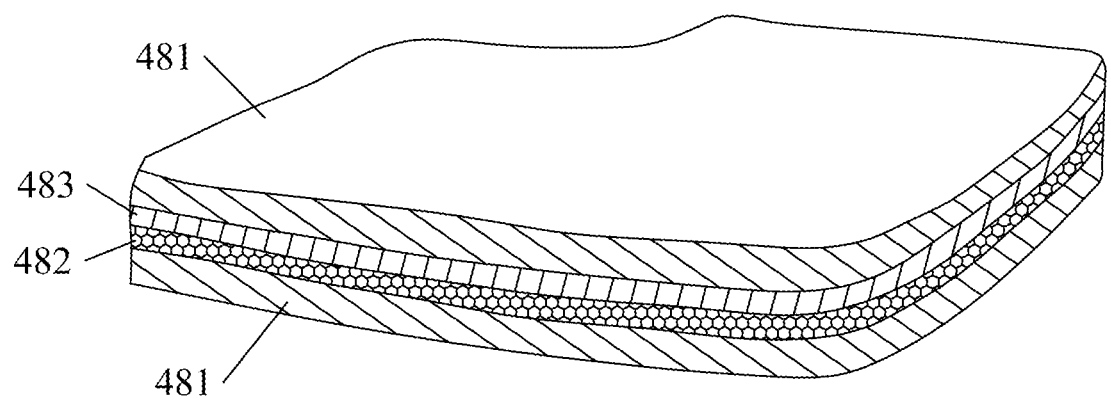
FIG. 8 is a perspective diagram of a fireproof buffering structure according to an eighth embodiment of the present application.

Please refer to FIG. 8. FIG. 8 is a perspective diagram of a fireproof buffering structure 48 according to an eighth embodiment of the present application. The fireproof buffering structure 48 includes two buffering plates 481, a fireproof plate 482, and a first auxiliary fireproof plate 483. A surface of the fireproof plate 482 is attached to one of the two buffering plates 481. A surface of the first auxiliary fireproof plate 483 is attached to another surface of the fireproof plate 482, and the other buffering plate 481 is attached to another surface of the first auxiliary fireproof plate 483.

Figure 9:
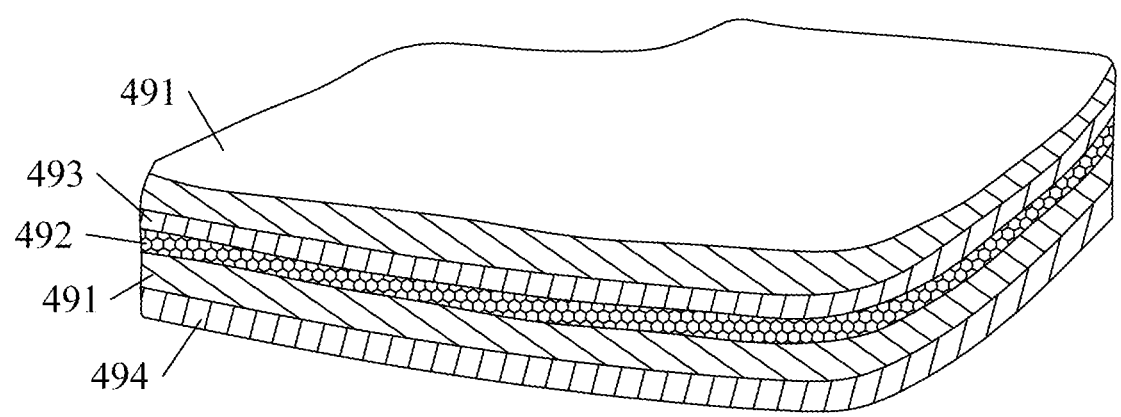
FIG. 9 is a perspective diagram of a fireproof buffering structure according to a ninth embodiment of the present application.

Please refer to FIG. 9. FIG. 9 is a perspective diagram of a fireproof buffering structure 49 according to a ninth embodiment of the present application. The fireproof buffering structure 49 includes two buffering plates 491, a fireproof plate 492, a first auxiliary fireproof plate 493, and a second auxiliary fireproof plate 494. The first auxiliary fireproof plate 493 and the fireproof plate 492 are attached between opposite surfaces of the two buffering plates 491 facing towards each other, and the second auxiliary fireproof plate 494 is attached to another surface of the two buffering plates 491 other than the opposite surfaces of the two buffering plates 491.

Figure 10:
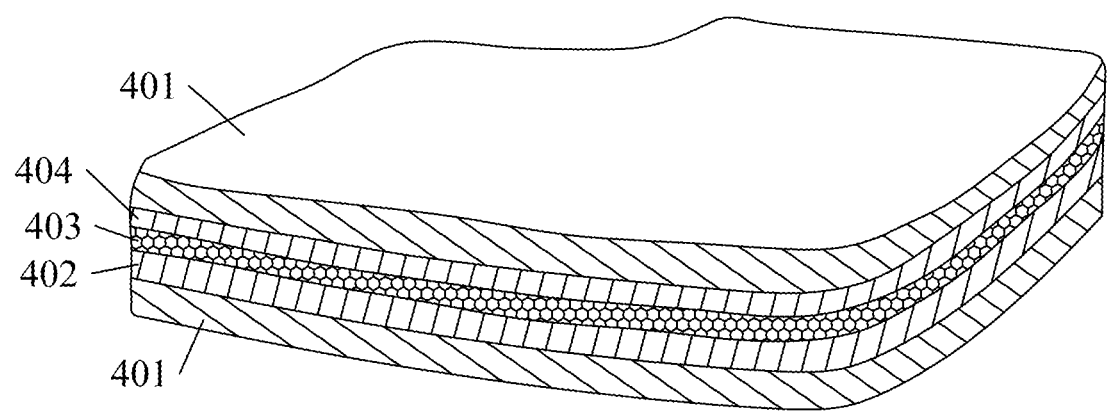
FIG. 10 is a perspective diagram of a fireproof buffering structure according to a tenth embodiment of the present application.

Please refer to FIG. 10. FIG. 10 is a perspective diagram of a fireproof buffering structure 40 according to a tenth embodiment of the present application. The fireproof buffering structure 40 is a quintuple-layered structure and includes two buffering plates 401, a fireproof plate 402, a first auxiliary fireproof plate 403, and a second auxiliary fireproof plate 404. A surface of the fireproof plate 402 is attached to one of the two buffering plates 401, a surface of the first auxiliary fireproof plate 403 is attached to another surface of the fireproof plate 402, a surface of the second auxiliary fireproof plate 404 is attached to another surface of the first auxiliary fireproof plate 403, and the other buffering plate 401 is attached to another surface of the second auxiliary fireproof plate 404.

The abovementioned buffering plates of the second embodiment to the tenth embodiment can be foam plates as the foam plate of the first embodiment. The fireproof plate, the first auxiliary fireproof plate, and the second auxiliary fireproof plate can be made of PE, PP, EPS, EPP, EPO, fireproof foam, EVA, or botanical cotton. Combustion rates of the first auxiliary fireproof plate and the second auxiliary fireproof plate are lower than the combustion rate of the buffering plates. For the third embodiment to the sixth embodiment, two or all of the fireproof plate, the first auxiliary fireproof plate, and the second auxiliary fireproof plate can be made of the same material or different materials. For the seventh embodiment to the ninth embodiment, the fireproof plate and the first auxiliary fireproof plate are made of different materials. The second auxiliary fireproof plate 494 of the ninth embodiment can be made of the same material as one of the fireproof plate 492 and the first auxiliary fireproof plate 493 or can be made of a material different from the fireproof plate 492 and the first auxiliary fireproof plate 493. For the tenth embodiment, the fireproof plate 402 and the second auxiliary fireproof plate 404 can be respectively made of a material different from the first auxiliary fireproof plate 403, while the fireproof plate 402 and the second auxiliary fireproof plate 404 can be made of the same material or different materials. By adjusting the materials of the multiple fireproof plates, an integral combustion rate of the fireproof buffering structure can be adjusted. Besides, the fireproof plates are usually harder than the buffering plates, which can transfer an impact onto the entire buffering plates during a crash accident so that the buffering plates are deformed uniformly to achieve better buffering effect.

Figure 11:
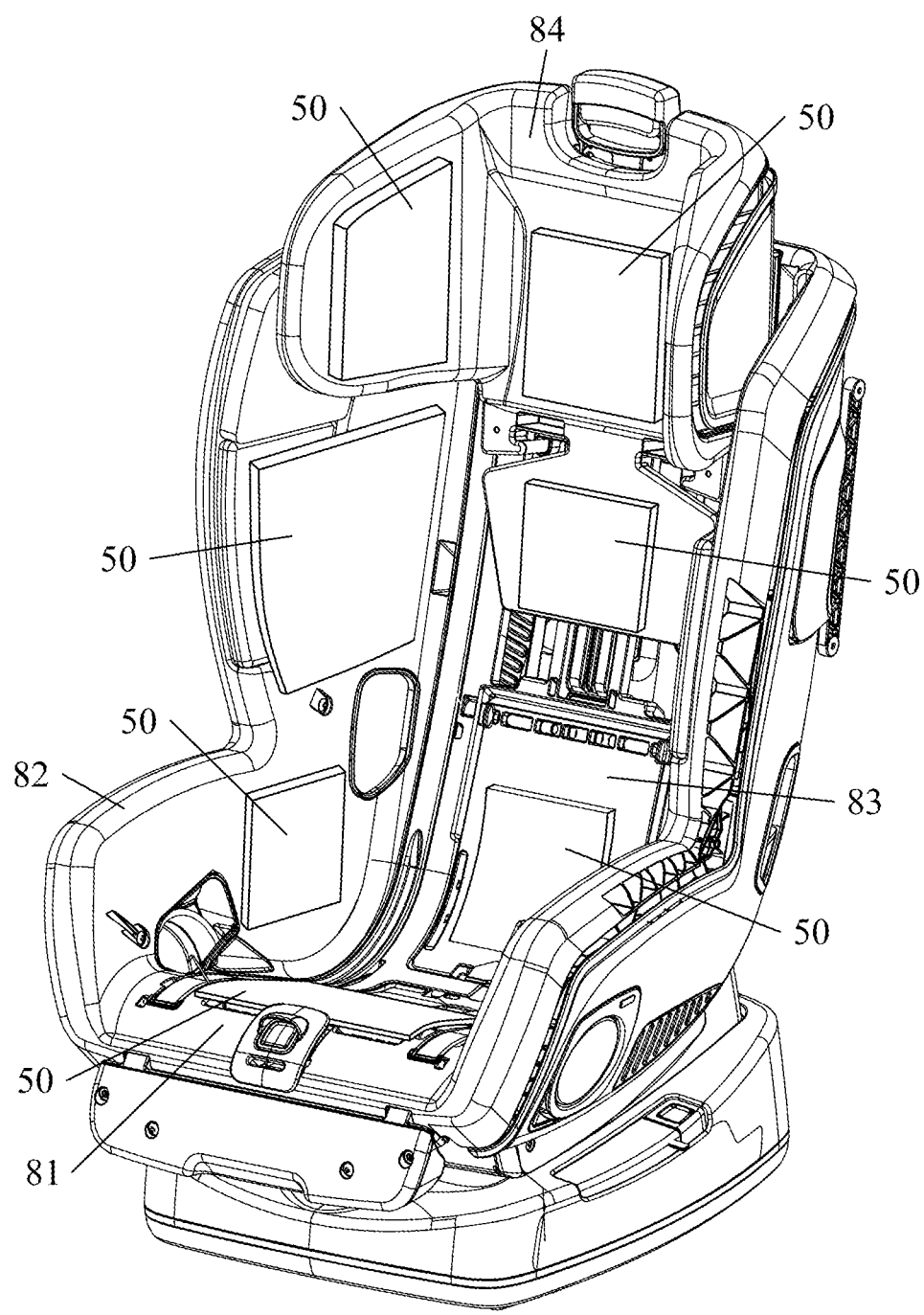
FIG. 11 is a perspective diagram of a child safety car seat with the fireproof buffering structure of the present application.

Please refer to FIG. 11. FIG. 11 is a perspective diagram of a child safety car seat 8 with the fireproof buffering structure 50 of the present application. The present application further discloses the child safety car seat 8 with a fireproof buffering structure 50. The fireproof buffering structure 50 can be disposed on or directly attached on a main body of the child safety car seat 8. For example, the buffering structure 50 can be attached to a position on at least one of a seat portion 81, a side portion 82, a backrest portion 83, and a headrest portion 84 of the main body. According to the position where the buffering structure 50 is attached, a shape of the buffering structure 50 can be strip-shaped, rectangular, or circular, but not limited thereto. It is noticed that the buffering structure 50 can be, but is not limited to, one of the buffering structures according to the first embodiment to the tenth embodiment. Besides, if an outmost layer of the fireproof buffering structure 50 is a fireproof plate, the fireproof plate is closer to a seating space of the child safety car seat 8 than the neighboring buffering plates or the buffering plate that the fireproof plate is attached to. That is, the buffering plates are positioned between the fireproof plate and an inner side of the child safety car seat 8 so that the fireproof plate is in contact with a child in the child safety car seat 8.

Figure 12:
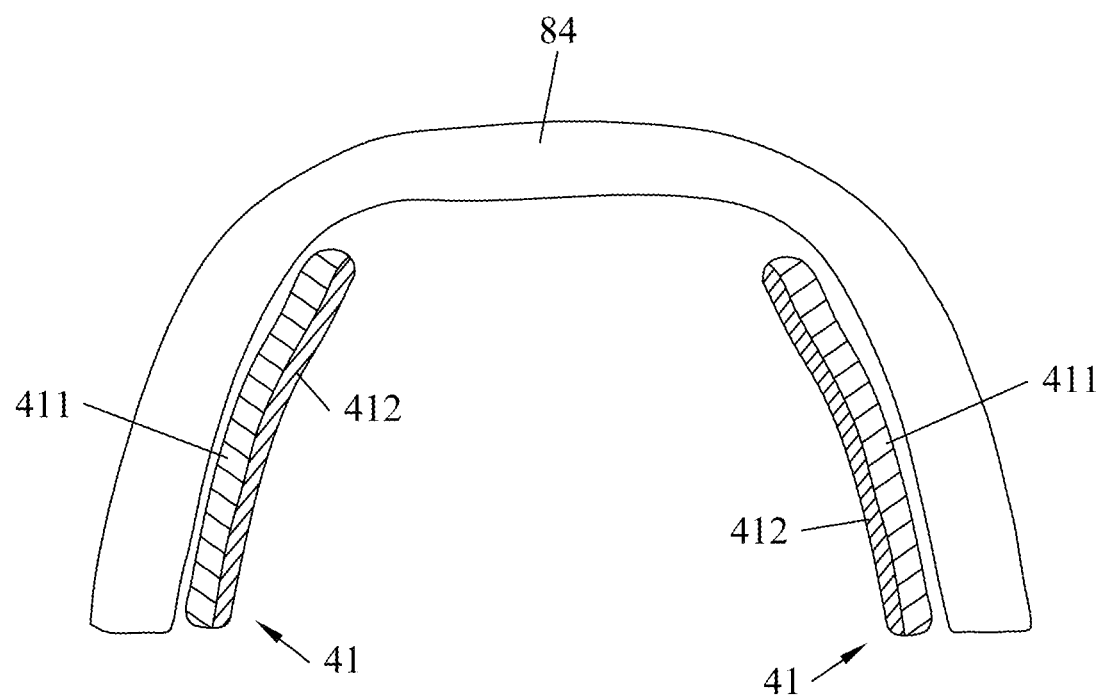
FIG. 12 is a top view of the fireproof buffering structure disposed to a headrest portion according to the first embodiment of the present application.
Figure 13:
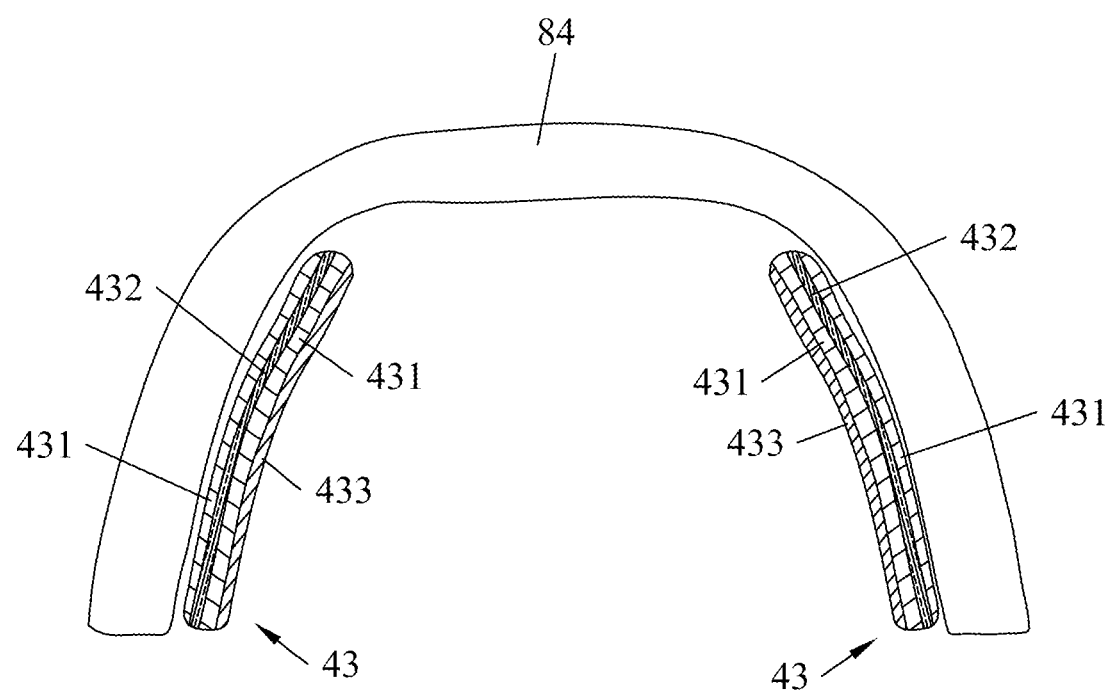
FIG. 13 is a top view of the fireproof buffering structure disposed to the headrest portion according to the third embodiment of the present application.
Figure 14:
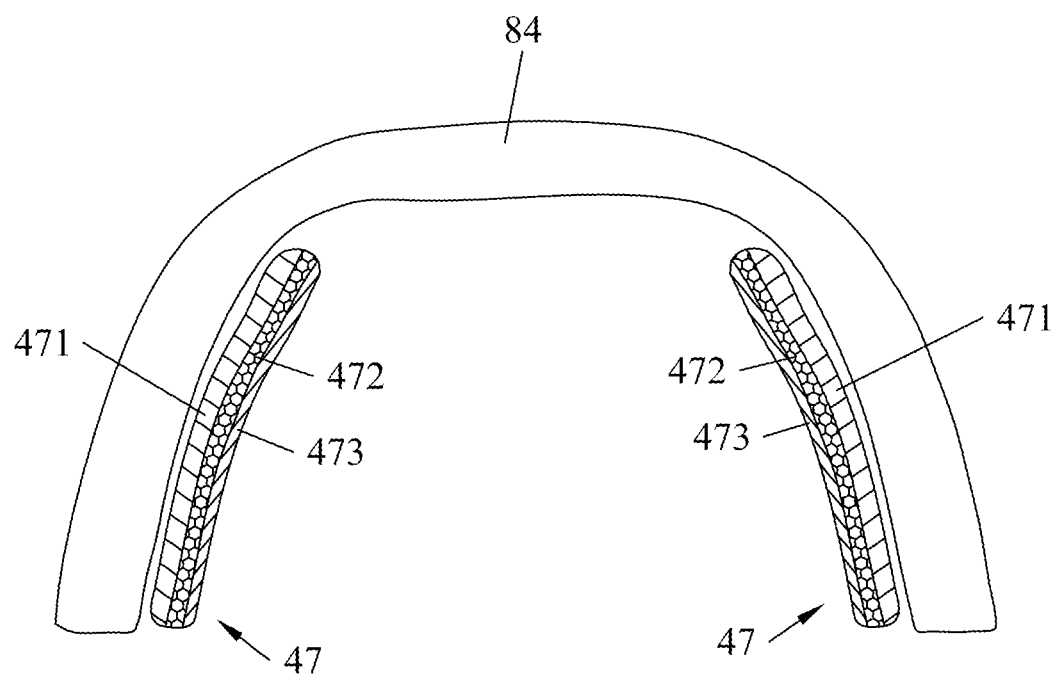
FIG. 14 is a top view of the fireproof buffering structure disposed to the headrest portion according to the seventh embodiment of the present application.
Figure 15:
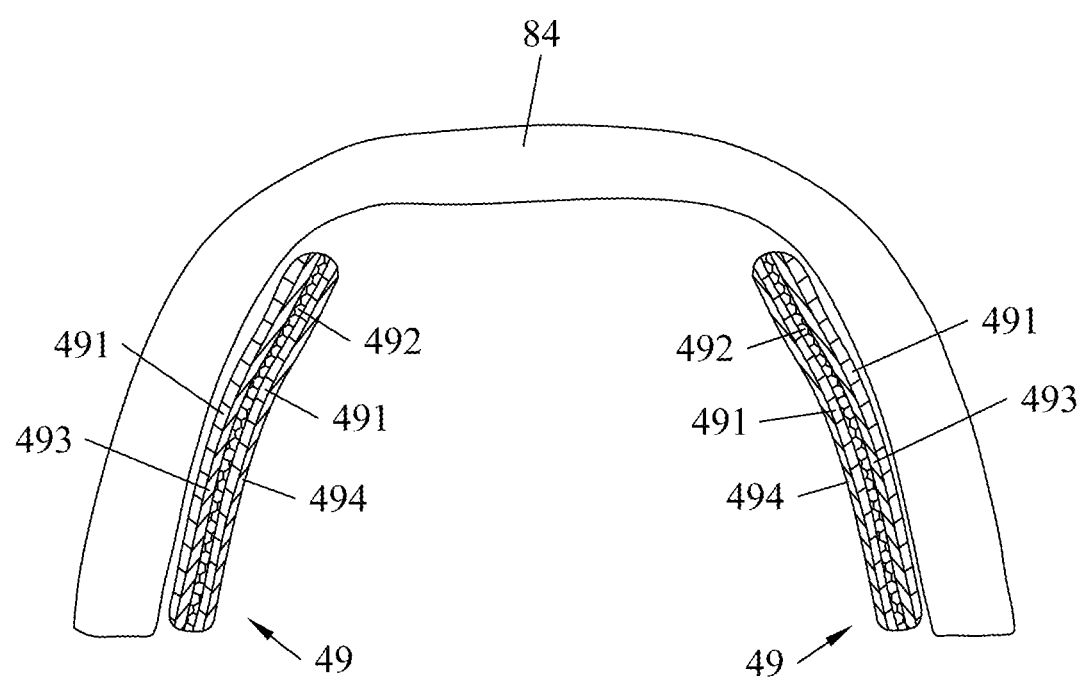
FIG. 15 is a top view of the fireproof buffering structure disposed to the headrest portion according to the ninth embodiment of the present application.

Further detail of that the abovementioned fireproof buffering structures are configured for the first embodiment, the third embodiment, the seventh embodiment, and the ninth embodiment is described as follows. Please refer to FIG. 12. FIG. 12 is a top view of the fireproof buffering structure 41 disposed to the headrest portion 84 according to the first embodiment of the present application. As shown in FIG. 12, the fireproof buffering structures 41 are disposed on inner sides of two flanking sides of the headrest portion 84. The fireproof plates 412 are closer to an inner space surrounded by the headrest portion 84 than the buffering plates 411. Please refer to FIG. 13 to FIG. 15. FIG. 13 is a top view of the fireproof buffering structure 43 disposed to the headrest portion 84 according to the third embodiment of the present application. FIG. 14 is a top view of the fireproof buffering structure disposed 47 to the headrest portion 84 according to the seventh embodiment of the present application. FIG. 15 is a top view of the fireproof buffering structure 49 disposed to the headrest portion 84 according to the ninth embodiment of the present application. As shown in FIG. 13 to FIG. 15, the first auxiliary fireproof plates 433, 473 of the fireproof buffering structures 43, 47 respectively and the second auxiliary fireproof plates 494 of the fireproof buffering structures 49 are closer to an inner space surrounded by the headrest portion 84, while the buffering plates 431 of the fireproof buffering structures 43 are between the first auxiliary fireproof plates 433 and the inner sides of the headrest portion 84, and the buffering plates 471 of the fireproof buffering structures 47 are between the first auxiliary fireproof plates 473 and the inner sides of the headrest portion 84, and the buffering plates 491 of the fireproof buffering structures 49 are between the second auxiliary fireproof plate 494 and the inner sides of the headrest portion 84.

Figure 16:
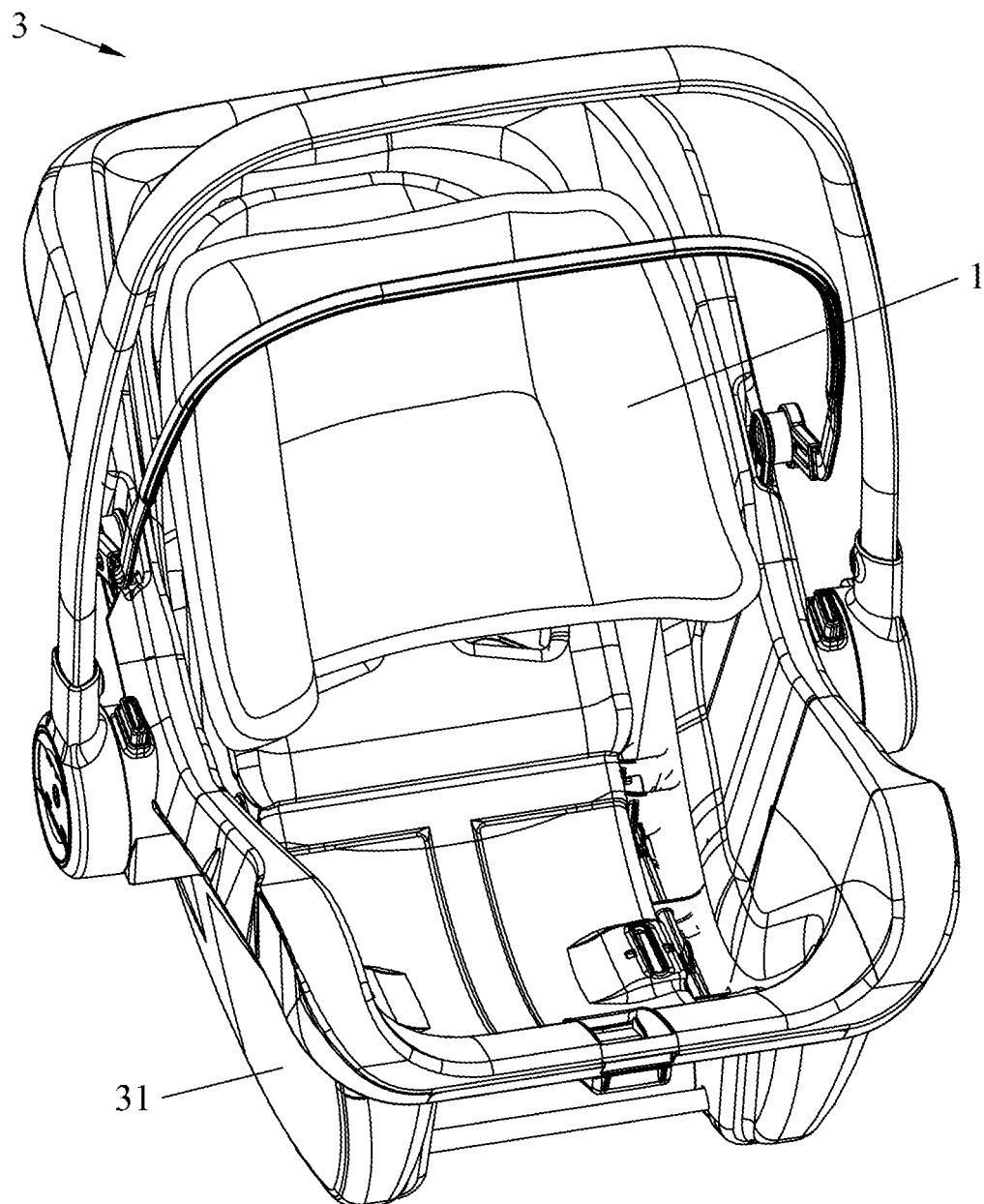
FIG. 16 is a perspective diagram of the child safety car seat with a supporting cushion apparatus according to an embodiment of the present application.

Please refer to FIG. 16. FIG. 16 is a perspective diagram of a child safety car seat 3 with a supporting cushion apparatus 1 according to an embodiment of the present application. As shown in FIG. 16, the present application further discloses that the child safety car seat 3 includes a main body 31 and the supporting cushion apparatus 1 disposed on the main body 31. The supporting cushion apparatus 1 can be a headrest for supporting the infant's head in the child safety car seat 3. The supporting cushion apparatus 1 includes the fireproof buffering structure disclosed by the present application so as to provide protection for the infant's head.

Figure 17:
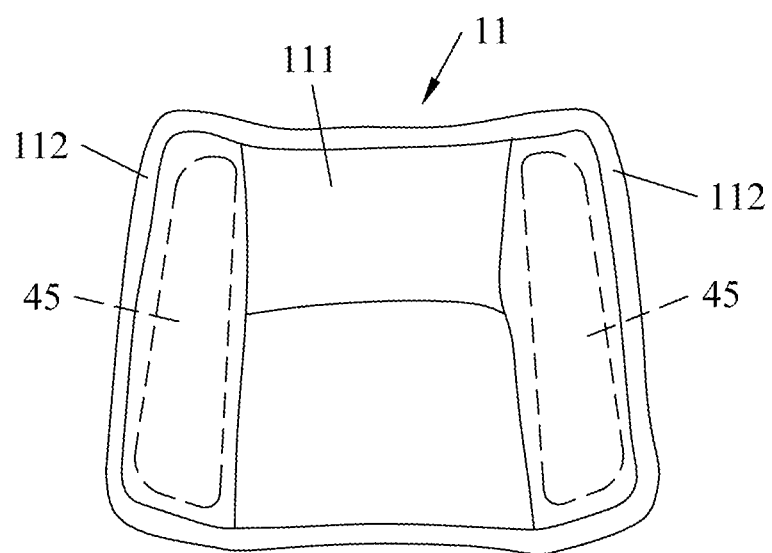
FIG. 17 is a perspective diagram of the supporting cushion apparatus according to the embodiment of the present application.
Figure 18:
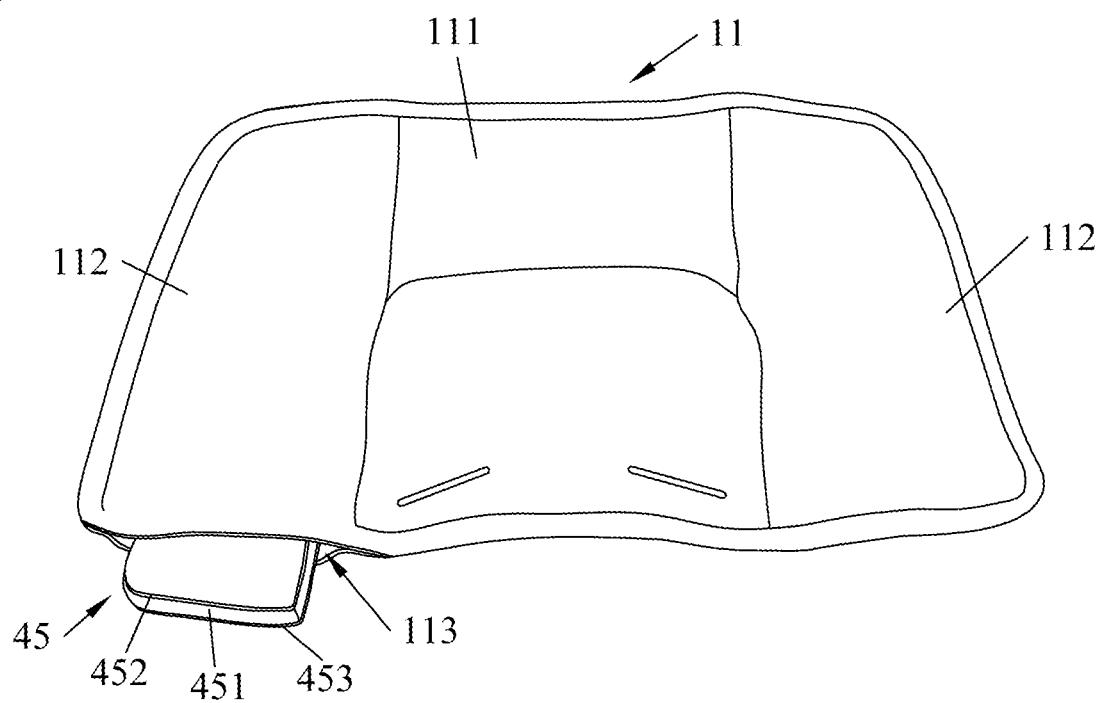
FIG. 18 is a diagram of the fireproof buffering structure partially accommodated in a covering pocket according to an embodiment of the present application.

Please refer to FIG. 17 and FIG. 18. FIG. 17 is a perspective diagram of the supporting cushion apparatus 1 according to the embodiment of the present application. FIG. 18 is a diagram of the fireproof buffering structure 45 partially accommodated in a covering pocket 113 according to an embodiment of the present application. The supporting apparatus 1 includes a covering member 11 and the fireproof buffering structure 45 accommodated inside the covering member 11. The fireproof buffering structure 45 can be a structure of the abovementioned fifth embodiment, which includes the buffering plate 451, and the fireproof plate 452 and the first auxiliary fireproof plate 453 respectively attached to a front surface of the buffering plate 451 and a rear surface of the buffering plate 451. The covering member 11 includes a head supporting portion 111 and two flanking portions 112 connected with two sides of the head supporting portion 111. A child in a car ride can rest his or her head on the head supporting portion 111. The fireproof buffering structure 45 can be accommodated in each of the two flanking portions 112 which are located on two sides of the child's head for providing protection. Specifically, the covering pocket 113 with an opening can be disposed on at least one of the two flanking portions 112 and the head supporting portion 111, and the fireproof buffering structure 45 can be put into the covering pocket 113 through the opening in a detachable and replaceable manner. That is, the fireproof buffering structure 45 can be entirely covered and accommodated inside an insertable and receivable receiving space within the covering pocket 113 disposed on the at least one of the head supporting portion 111 and the two flanking portions 112 through the opening, so that the fireproof buffering structure 45 can be restrained inside the covering member 11 after being enclosed into the covering pocket 113. A shape of the fireproof buffering structure 45 can correspond to shapes of the flanking portion 112 and the covering pocket 113, and a size of the fireproof buffering structure 45 can be only slightly smaller than the covering pocket 113 so that the fireproof buffering structure 45 can be properly restrained in the flanking portion 112 after being enclosed into the covering pocket 113. The fireproof buffering structure 45 can also be accommodated in the head supporting portion 111. For example, in another embodiment of the present application, the fireproof buffering structures 45 are accommodated in the head supporting portion 111 and the flanking portions 112 of the covering member 11. In another embodiment of the present application, the fireproof buffering structure 45 is accommodated only in the head supporting portion 111 but not in the flanking portions 112, and the description of the exemplary embodiments are intended to be illustrative and not to limit the scope of the invention.

Since the fireproof plate 452 made of PE is harder than the buffering plate 451 and is disposed on a surface of the fireproof buffering structure 45 closer to an inner space surrounded by the covering member 11, the infant with his or her head rested in the inner space and on the fireproof plate 452 might feel uncomfortable. Therefore, a soft filler can be disposed on the fireproof plate 452 accommodated in the flanking portion 112. A side compartment can be disposed outside the covering pocket 113 accommodated in the flanking portion 112 or in the head supporting portion 111, and the soft filler can fill the side compartment. In other embodiments, the soft filler can directly fill the covering pocket 113 for covering the fireproof plate 452 or can be disposed on the fireproof plate 452 accommodated in the covering pocket 113 or the head supporting portion 111, and the description of the exemplary embodiments are not intended to limit the scope of the invention but to be illustrative about that the soft filler is required to be positioned on an outer surface of the fireproof plate 452. The soft filler can be foam made of materials, such as PU, EPP, EPS, or EPE, or can be made of a material that improves comfortableness, such as cotton. It is noticed that the fireproof buffering structure accommodated in the supporting cushion apparatus 1 can be formed in other configurations else the fireproof buffering structures of the first embodiment to the tenth embodiment besides the abovementioned fireproof buffering structure 45.

In contrast to conventional buffering structures, the fireproof buffering structure of the present application includes the buffering plate and the fireproof plate combined with each other. The buffering plate has good impact absorbing capacity for providing a soft and comfortable seating environment and buffering and protection effects during a crash accident. Besides, the attached fireproof plate can reduce the combustion rate of the integral structure when catching fire. Therefore, the fireproof buffering structure, which can be disposed in the child safety car seats, achieves the inventive purposes of safety and comfort.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety car seat comprising:
   a main body; and
   a fireproof buffering structure disposed on the main body, the fireproof buffering structure comprising:
      a buffering plate; and
      a fireproof plate attached to or neighboring to the buffering plate, the fireproof plate being closer to a seating space of the child safety car seat than the buffering plate.

2. The child safety car seat of claim 1, wherein a combustion rate of the fireproof plate is lower than a combustion rate of the buffering plate.

3. The child safety car seat of claim 1, wherein the buffering plate is a foam plate.

4. The child safety car seat of claim 3, wherein a density of the foam plate is substantially between 75 kg/m$^3$ and 98 kg/m$^3$.

5. The child safety car seat of claim 1, wherein the fireproof plate is made of at least one of polyethylene (PE), polypropylene (PP), expanded polystyrene (EPS), expanded polypropylene (EPP), expanded polystyrene (EPO), fireproof foam, ethylene-vinylacetate copolymer (EVA), and botanical cotton.

6. The child safety car seat of claim 1, wherein a thickness of the fireproof buffering structure is substantially smaller than 13 mm.

7. The child safety car seat of claim 6, wherein the thickness of the fireproof buffering structure is substantially equal to 12 mm.

8. The child safety car seat of claim 1, wherein the fireproof buffering structure comprises a plurality of fireproof plates, and at least part of the plurality of fireproof plates are made of different materials.

9. The child safety car seat of claim 1, wherein a shape of the fireproof plate corresponds to a shape of the buffering plate, and the fireproof plate is attached to a surface of the buffering plate.

10. The child safety car seat of claim 9, wherein the fireproof buffering structure comprises two buffering plates respectively attached to two opposite surfaces of the fireproof plate.

11. The child safety car seat of claim 10, wherein the fireproof buffering structure further comprises a first auxiliary fireproof plate attached to a surface of one of the two buffering plates away from the fireproof plate and adjacent to the seating space of the child safety car seat.

12. The child safety car seat of claim 9, wherein the fireproof buffering structure further comprises a first auxiliary fireproof plate, the fireproof plate is attached between the buffering plate and the first auxiliary fireproof plate, and the buffering plate and the first auxiliary fireproof plate are attached to two opposite surfaces of the fireproof plate.

13. The child safety car seat of claim 9, wherein the fireproof buffering structure comprises two buffering plates, the fireproof plate is attached to one of the two buffering plates, a surface of the first auxiliary fireproof plate is attached to the fireproof plate, and the other one of the two buffering plates is attached to an another surface of the first auxiliary fireproof plate.

14. The child safety car seat of claim 13, wherein the fireproof buffering structure further comprises a second auxiliary fireproof plate, the first auxiliary fireproof plate and the fireproof plate are attached between opposite surfaces of the two buffering plates facing towards each other, and the second auxiliary fireproof plate is attached to an another surface of the one of the two buffering pates other than the opposite surfaces of the two buffering plates.

15. The child safety car seat of claim 1, further comprising a covering member, the fireproof buffering structure being entirely covered and accommodated inside an insertable and receivable receiving space within a covering pocket accommodated in the covering member through an opening, so that the fireproof buffering structure is restrained inside the covering member after being enclosed into the covering pocket.

16. The child safety car seat of claim 15, wherein the covering member comprises a head supporting portion and two flanking portions connected with two sides of the head supporting portion, and the fireproof buffering structure is accommodated in at least one of the head supporting portion and the two flanking portions.

17. The child safety car seat of claim 16, wherein a soft filler is disposed on a surface of the fireproof buffering structure accommodated in the at least one of the head supporting portion and the two flanking portions.

18. The child safety car seat of claim 1, wherein the fireproof buffering structure is attached on at least one of a seat portion, a side portion, a backrest portion and a headrest portion of the main body.

19. The child safety car seat of claim 1, wherein the buffering plate is positioned between the fireproof plate and an inner side of the child safety car seat.

* * * * *